(No Model.) 2 Sheets—Sheet 2.
D. S. WILLIAMS.
ELECTRIC BATTERY.
No. 594,051. Patented Nov. 23, 1897.
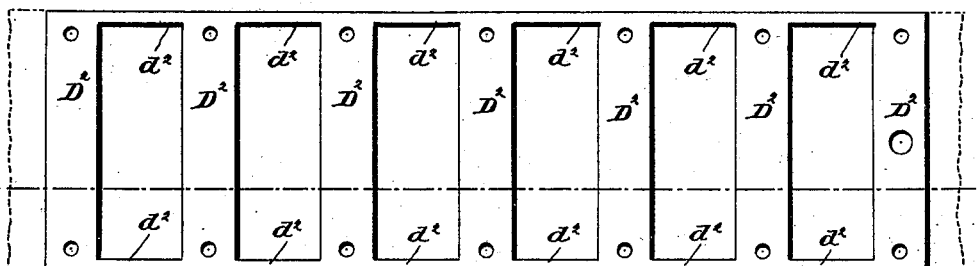
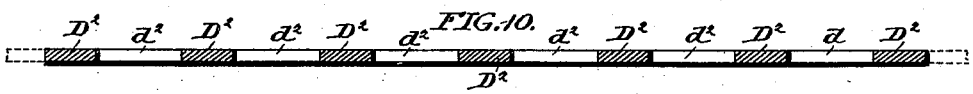
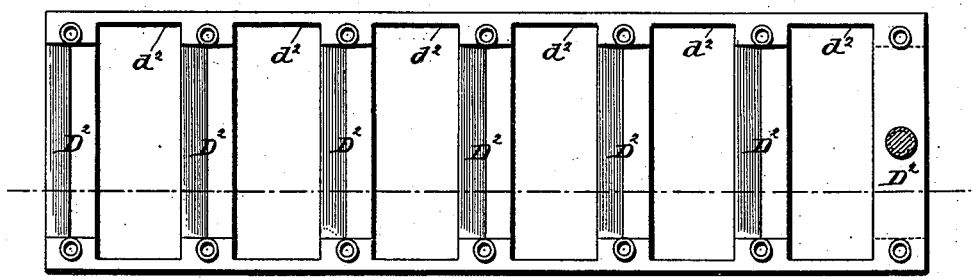
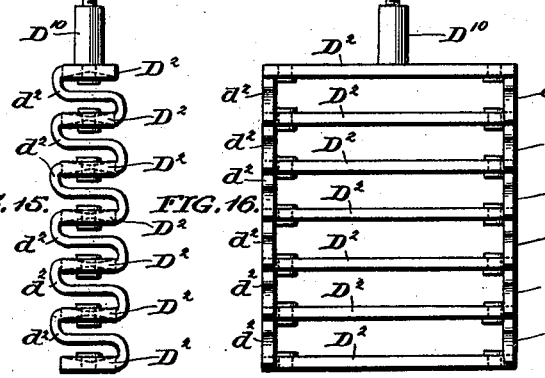
Witnesses. Inventor.

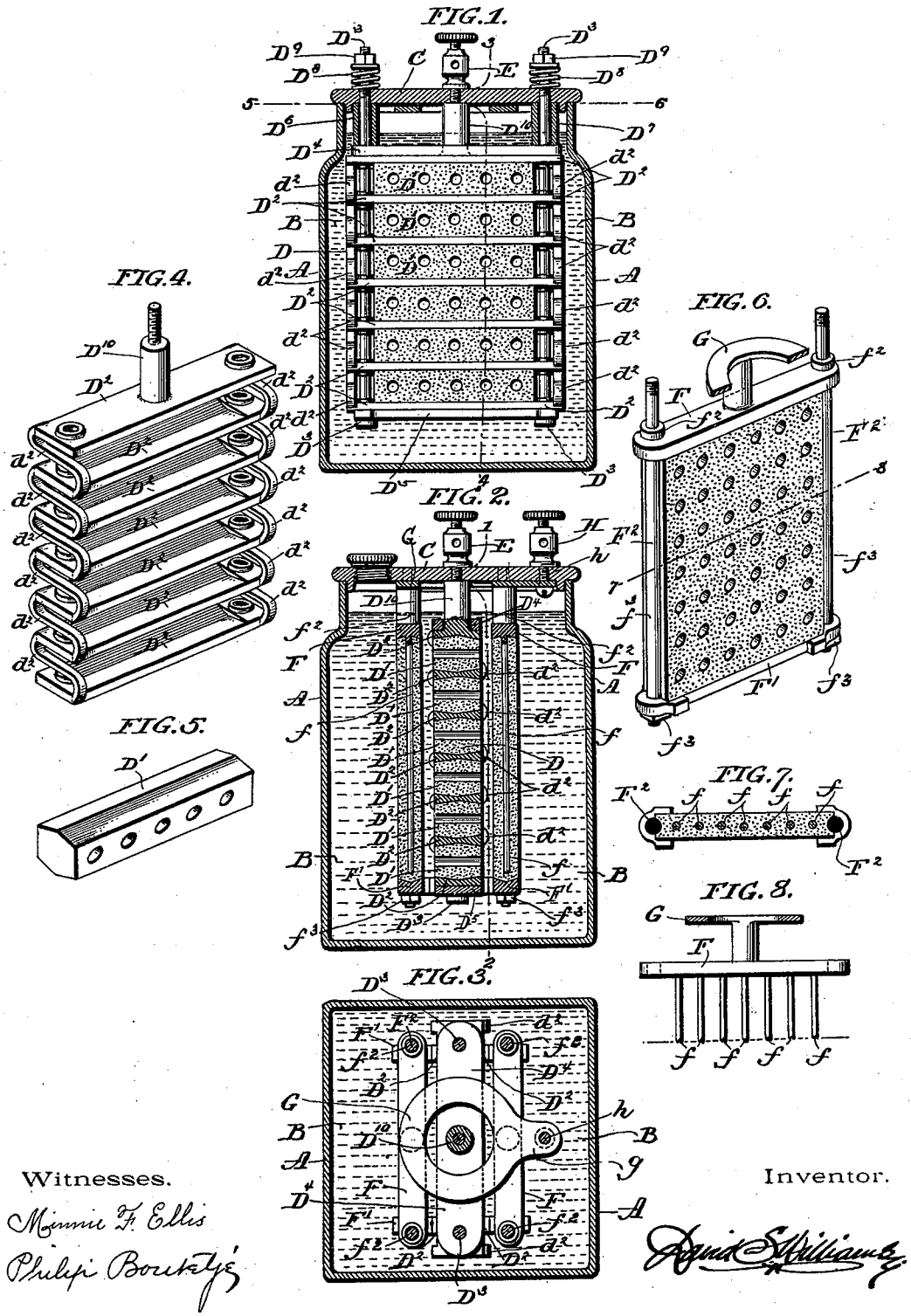

ered with antimony, if desired.

UNITED STATES PATENT OFFICE.

DAVID S. WILLIAMS, OF PHILADELPHIA, PENNSYLVANIA.

ELECTRIC BATTERY.

SPECIFICATION forming part of Letters Patent No. 594,051, dated November 23, 1897.

Application filed August 23, 1895. Serial No. 560,214. (No model.)

*To all whom it may concern:*

Be it known that I, DAVID S. WILLIAMS, a citizen of the United States, residing at Philadelphia, county of Philadelphia, and State of Pennsylvania, have invented a new and useful Improvement in Electrical Batteries, of which the following is a full, clear, and exact description, reference being had to the accompanying drawings, which form a part of this specification.

My invention relates to certain new and useful improvements in storage batteries, the main object being to construct the electrodes and conductors forming a part thereof light, powerful, and inexpensive to prevent the buckling of said electrodes in charging and discharging, and to provide means whereby the parts thereof may be readily changed when damaged or corroded by long continuous service.

Referring to the accompanying drawings, Figure 1 is a sectional view of a storage battery constructed in accordance with my invention, the section being taken on the line 1 2 of Fig. 2. Fig. 2 is a sectional view on the line 3 4 of Fig. 1. Fig. 3 is a sectional plan view taken on the line 5 6 of Fig. 1. Fig. 4 is a detached perspective view of the conductors. Fig. 5 is a detached perspective view of one of the sections of peroxid forming the active material in the positive electrode. Fig. 6 is a perspective view of one of the negative electrodes. Fig. 7 is a section of the negative electrode, the same being taken on the line 7 8 of Fig. 6. Fig. 8 is a detached side elevation of a portion of the negative electrode more fully explained hereinafter. Fig. 9 is a plan view of the conductors of the positive electrode, showing the method of forming the same from a sheet of rolled lead. Fig. 10 is a section on the line 9 10 of Fig. 9. Fig. 11 is a plan view of the conductors after being pressed into the required shape, but prior to being shaped into the form of an electrode. Fig. 12 is a section on the line 11 12 of Fig. 11. Figs. 13 and 14 are sectional views similar to that shown in Fig. 12, but having the form of the conducting-plates slightly modified. Fig. 15 is an end view of the conductors arranged in place to form an electrode, and Fig. 16 is a side view of the conductors as arranged in Fig. 15.

Similar letters of reference refer to similar parts throughout the several views of the drawings.

A designates a containing vessel preferably made of glass, hard rubber, or other suitable non-conducting material.

B is the electrolyte, formed of dilute sulfuric acid.

C is a cover made of hard rubber or other non-conducting material and fitted snugly to the top of the containing vessel.

The positive electrode D is formed of sections of active material $D'$, interposed between conducting-plates $D^2$, the active material being formed of a compound having an oxid of lead as a base, combined with other metallic salts which render said sections of active material exceedingly porous and a comparatively good conductor of electrical energy. Said sections are formed in dies under heavy pressure and are then converted into a peroxid of lead by electrolysis prior to being assembled to form a completed electrode. The sections of lead peroxid are then passed through revolving scrapers and any irregularity in the surfaces $d$, caused during the process of forming, are removed, so that the sections when placed between the conducting-plates will have a perfect bearing upon said plates.

The conducting-plates $D^2$ and connecting-strips $d^2$ are formed from a sheet of rolled lead containing a small percentage of antimony and are stamped out under suitable dies in one operation. Said plates $D^2$ and strips $d^2$ then assume the form shown in Figs. 11 and 12. The conducting-plates are then arranged one above the other in position to receive the active material, as illustrated in Figs. 4, 15, and 16.

After the sections of active material $D'$ have been placed between the conducting-plates $D^2$ the whole structure is bound together by bolts $D^3$, which I prefer to form of steel covered with a thin layer of porcelain, although said bolts may be made of lead hardened with antimony, if desired.

Above and below the conducting-plates $D^2$ are stout plates of hard rubber $D^4$ and $D^5$, which distribute the tension placed upon the conducting-strips and sections of lead peroxid. The plate $D^5$ also acts, in conjunction with a similar plate on the negative electrode, to keep the electrodes the proper distance apart. Between the plate $D^4$ and the cover C are collars $D^6$ and $D^7$, which encircle the bolts $D^3$ and act as spacing-pieces between the electrode and the cover. The bolts $D^3$ pass through the cover C, above which are placed spiral springs $D^8$ and nuts $D^9$, by means of which a slight tension is placed upon said bolts to draw the conducting-plates and sections of active material together. The tension imparted by the springs $D^8$ should be only sufficient to keep the conducting-plates and active material together to insure a good contact when the active material has been discharged and to allow for the expansion of the active material when the same is again being recharged. This not only to a large extent prevents the disintegration of the active material, but also prevents any buckling or twisting of the electrode, which very frequently occurs in electrodes of the grid type. It is also very desirable that the sections of lead peroxid should be free to expand laterally and not be obstructed at the ends by conducting strips or plates which would tend in any way to prevent such expansion. In the center of the positive electrode and formed integral with the upper conducting-plate is a stem $D^{10}$, and firmly inserted therein is a hard-metal rod threaded to receive the binding-post E.

The negative electrode consists of a capplate F, formed of an alloy of lead and antimony, having conductors $f$, which extend down through the body of the electrode, consisting of a mass of finely-divided or spongy lead. This mass is held firmly in position by means of hard-rubber bolts $F^2$, which fit in semicircular grooves in the sides thereof and which bind the plates F and F' together, the bottom plate F' being preferably formed of hard rubber, and, as previously stated, acting also as a spacing-piece to keep the negative and positive electrodes the proper distance apart. The bolts $F^2$ are secured to the cover C and have rings $f^2$ formed thereon, which form bearings for the cap-plate F, although, if desired, the said bolts may be made straight and secured to the cover in the same manner as the positive element; but, as shown in Fig. 6, the frame comprising the metal cap-piece F, the side bolts $F^2$, and the bottom plate F' are bound together to support the mass of spongy lead by means of nuts $f^3$ at the bottom of the electrode.

The negative electrode, if desired, may be built up in the same manner as the positive element; but as the expansion and contraction are exceedingly slight it is not deemed advisable to provide for the slight variation which takes place. At the top of the negative electrodes is a coupling-ring G, which has a lug $g$, to which the binding-post H is secured by means of the screw $h$. It will be readily seen that the surface of the conducting-plates may be variously modified, as shown in Figs. 13 and 14, for the purpose of keeping the active material in place without departing from the spirit of my invention. In a cell of this construction the electrodes are light, durable, and inexpensive, and as all known electric conductors, except a few rare and expensive metals, such as gold and platinum, rapidly disintegrate under the action of electrolytic oxygen, my purpose, therefore, is not to construct an electrode which shall stand the action of repeated charges and discharges for an indefinite period, but one which shall be capable of lasting a reasonable time and which can be repaired at very small cost.

Having thus described my invention, what I claim, and desire to secure by Letters Patent, is—

1. A conductor and support for the active material of a battery-electrode formed of a single sheet of metal stamped or cut out and then bent transversely upon itself in such manner as to form a series of superposed channeled plates united by integral yielding conducting-strips.

2. In a positive electrode, the combination of a series of blocks of active material, and a conductor in contact therewith, said conductor being formed of a single sheet of metal cut away at intervals to form integral yielding connecting-strips and then bent transversely upon itself to form a series of superimposed channeled plates between which said blocks of active material are supported.

3. In a positive electrode, the combination of a series of channeled supporting and conducting plates united by integral yielding conducting-strips, blocks of active material between said plates, rods passing through said plates to hold the same in position, the coverplate C, compression-springs surrounding the rods at a point outside the cover, and filler blocks or sleeves $D^6$ interposed between the under surface of the cover and the top of the electrode.

4. In a battery, a casing, a cover-plate to which the electrodes are secured, a central positive electrode having at its bottom a plate of non-conducting material of a width greater than that of the electrode, and negative electrodes on either side of the positive electrodes, said negative electrodes having bottom plates of non-conducting material wider than said plates and in contact with the non-conducting plate of the positive electrode.

5. The combination in an electric battery of the central positive electrode D formed of blocks of active material D' interposed between conducting-plates $D^2$, plates $D^4$ and $D^5$ situated respectively above and below the body of the electrode and secured thereto, negative electrodes comprising cap-plates F, conducting-bars $f$, and spongy lead surrounding said bars, a bottom plate F' of non-conducting material secured to the negative electrode, a conductor G connecting the two negative electrodes, and binding-posts connected to the positive electrodes respectively, substantially as specified.

In testimony of which invention I have hereunto set my hand.

DAVID S. WILLIAMS.

Witnesses:
 GEO. W. REED,
 MINNIE F. ELLIS.